United States Patent Office 3,836,529
Patented Sept. 17, 1974

3,836,529
DERIVATIVES OF 2-METHYLTHIO- AND 2-PHENYL - 4,6-DICHLORO-5-PYRIMIDINE-CARBOXALDEHYDE
Arthur A. Santilli, Havertown, Dong H. Kim, Wayne, and Richard A. Fieber, Drexel Hill, Pa., assignors to American Home Products Corporation, New York, N.Y.
No Drawing. Filed Oct. 30, 1972, Ser. No. 302,302
Int. Cl. C07d 51/36
U.S. Cl. 260—240 G   14 Claims

ABSTRACT OF THE DISCLOSURE

2-Methylthio- and 2-phenyl-5-[N-(substituted)formimidoyl]-4,6-dichloropyrimidines have CNS-depressant activity.

---

This invention relates to new and pharmacologically active 2-methylthio- and 2-phenyl-5-[N-(substituted)-formimidoyl]-4,6-dichloropyrimidines.

4,6 - Di(methylamino) - 5-N-(methylamino)formimidoyl-pyrimidines are disclosed by H. Bredereck, *Chem. Ber.*, 100, 1344 (1967).

The invention sought to be patented comprises chemical compounds of the structural formula:

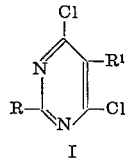

I

Where R is methylthio or phenyl and $R^1$ is 2-benzothiazolinyl, N - (halophenyl)formimidoyl, N - (p - methoxyphenyl)formimidoyl, N-(3,5-dichloro-4-hydroxyphenyl)-formimidoyl, N - (5 - chloro-o-tolyl)formimidoyl, N-(p-benzyloxyphenyl)formimidoyl, N - (2-carbamoylphenyl)-formimidoyl, N-(4-acetamidophenyl)formimidoyl.

As used herein, the term "halo" means a chlorine, bromine, iodine, or fluorine atom.

The compounds of Formula I exert a depressant action in the central nervous system as demonstrated by evaluation in standard pharmacological test procedures.

The compounds of Formula I are prepared by reacting 4,6-dichloro-2-phenyl-5-pyrimidinecarboxaldehyde or 4,6 - dichloro-2-methylthio-5 - pyrimidinecarboxaldehyde with a suitable primary amine, i.e. o-mercaptoaniline, a o-, p-, or m-haloaniline, p-anisidine, 3,5-dichloro-4-hydroxyaniline, 3 - chloro - 6 - methylaniline, p-benzyloxyaniline, anthranilamide, or 4-aminoacetanilide. The reaction is carried out in glacial acetic acid or in glacial acetic acid-chloroform at room temperature or with moderate heating. The product precipitates from the reaction mixture and is isolated and purified by conventional procedures.

In the case of reaction with o-mercaptoaniline, the reaction product is not a formimidoyl compound but a 2-benzothiazoline derivative presumably formed by cyclization of the initially formed formimidoyl compound.

The starting materials employed in the aforedescribed processes are either known compounds or can be prepared from known compounds by conventional methods.

When the compounds of the invention are employed as depressants of the central nervous system, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets, or capsules, containing such excipients as starch, lactose, magnesium stearate, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacolgically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

The manner and processes for making and using the compounds of the invention are illustrated in the following examples, where all temperatures are given in degrees Centigrade.

EXAMPLE I (a) 4,6 - Dichloro-2-methylthio - 5 - pyrimidinecarboxaldehyde (4.6 g.) is dissolved in glacial acetic acid (50 ml.). o-Mercaptoaniline (2.5 g.) is added, and the solution is allowed to stand until a precipitate is formed. Yield of 2 - (4,6-dichloro-2 - methylthio-5-pyrimidinyl)-benzothiazoline, after recrystallization from cyclohexane, 1.1 g.; m.p. 116–118°.

Analysis for $C_{12}H_9Cl_2N_3S_2$.—Calculated: C, 43.64; H, 2.75; N, 12.72; Cl, 21.47; S, 19.42. Found: C, 43.75; H, 2.77; N, 12.59; Cl, 21.29; S, 19.47.

(b) In a similar manner from 5.0 g. of 4,6-dichloro-2-phenyl - 5 - pyrimidinecarboxaldehyde and 2.5 g. of o-mercaptoaniline, there is obtained 9.7 g. of 2-(4,6-dichloro-2-phenyl-5 - pyrimidinyl) benzothiazoline; m.p. after recrystallization from cyclohexane, 156–158°.

Analysis for $C_{17}H_{11}Cl_2N_3S$.—Calculated: C, 56.68; H, 3.08; N, 11.66; Cl, 19.68; S, 8.90. Found: C, 56.94; H, 2.90; N, 11.71; Cl, 19.39; S, 8.60.

EXAMPLE II (a) 4,5 - Dichloro - 2-phenyl-5-pyrimidinecarboxaldehyde (2.53 g.) is dissolved in glacial acetic acid (15 ml.) and chloroform (30 ml.). p-Chloroaniline (1.27 g.) is added with stirring. Stirring is continued until a precipitate is formed. Yield of 4,6-dichloro-5-[N-(p-chlorophenyl)formimidoyl]-2-phenylpyrimidine, 2.5 g.; m.p. after recrystallization from chloroform, 190–193°.

Analysis for $C_{17}H_{10}Cl_3N_3$.—Calculated: C, 56.30; H, 2.78; Cl, 29.33; N, 11.59. Found: C, 56.00; H, 2.50; Cl, 29.38; N, 11.40.

(b) In a similar manner using o-chloroaniline in place of p-chloroaniline, there is obtained 4,6-dichloro-5-[N-(o-chlorophenyl)formimidoyl]-2-phenylpyrimidine; m.p. after recrystallization from ethyl acetate, 157–159°.

Analysis for $C_{17}H_{10}Cl_3N_3$.—Calculated: C, 56.30; H, 2.78; Cl, 29.33; N, 11.59. Found: C, 56.00; H, 2.81; Cl, 29.20; N, 11.52.

(c) In a similar manner using p-anisidine in place of p-chloroaniline, there is obtained 4,6-dichloro-5-[N-(p-methoxyphenyl)formimidoyl] - 2-phenylpyrimidine; m.p. after recrystallization from cyclohexane, 142–144°.

Analysis for $C_{18}H_{13}N_3OCl_2$.—Calculated: C, 60.35; H, 3.66; N, 11.73; Cl, 19.79. Found: C, 60.31; H, 3.54; N, 11.72; Cl, 19.53.

EXAMPLE III (a) 4,6 - Dichloro - 2-methylthio-5-pyrimidinecarboxaldehyde (2.2 g.) is dissolved in glacial acetic acid (20 ml.). p-Chloroaniline (1.3 g.) is added, and the solution is allowed to stand until a precipitate is formed. Yield of 4,6 - dichloro-5-[N-(p-chlorophenyl)formimidoyl]-2-methylthiopyrimidine, after recrystallization from pentane, 0.6 g.; m.p. 103–105°.

Analysis for $C_{12}H_8Cl_3N_3S$.—Calculated: C, 43.33; H, 2.42; N, 12.64; Cl, 31.98; S, 9.64. Found: C, 43.70; H, 2.34; N, 12.40; Cl, 31.78; S, 9.90.

(b) In a similar manner using 3,5-dichloro-4-hydroxyaniline in place of p-chloroaniline there is obtained 2,6-dichloro - 4 - [(4,6-dichloro-2-methylthio-5-pyrimidinylmethylene)amino]phenol; m.p. after recrystallization from cyclohexane, 139–141°.

Analysis for $C_{12}H_7Cl_4N_3OS$.—Calculated: C, 37.62; H, 1.84; N, 10.97; Cl, 37.02; S, 8.37. Found: C, 37.65; H, 2.20; N, 10.91; Cl, 37.07; S, 8.58.

(c) In a similar manner using o-chloroaniline in place of p-chloroaniline, there is obtained 4,6-dichloro-5-[N-(o-chlorophenyl)formimidoyl] - 2-methylthiopyrimidine; m.p. after recrystallization from heptane, 112–115°.

Analysis for $C_{12}H_8Cl_3N_3S$.—Calculated: C, 43.33; H, 2.42; N, 12.64; Cl, 31.98; S, 9.64. Found; C, 43.61; H, 2.57; N, 12.62; Cl, 31.91; S, 9.74.

(d) In a similar manner using 3 - chloro - 6 - methylaniline in place of p-chloroaniline, there is obtained 4,6-dichloro - 5 - [N - (5 - chloro - o-tolyl)formimidoyl]-2-methylthiopyrimidine; m.p. after recrystallization from ethanol, 145–147°.

Analysis for $C_{13}H_{10}Cl_3N_3S$.—Calculated: C, 45.04; H, 2.91; N, 12.12; Cl, 30.68; S, 9.25. Found: C, 45.17; H, 2.65; N, 12.05; Cl, 30.57; S, 9.45.

(e) In a similar manner using p-benzyloxyaniline in place of p-chloroaniline there is obtained -5-[N-(p-benzyloxyphenyl)formimidoyl] - 4,6 - dichloro-2-methylthiopyrimidine; m.p. after recrystallization from heptane, 105–108°.

Analysis for $C_{19}H_{15}Cl_2N_3OS$.—Calculated: C, 56.44; H, 3.74; N, 10.39; Cl, 17.54; S, 7.93. Found: C, 56.66; H, 3.87; N, 10.52; Cl. 17.26; S, 7.91.

EXAMPLE IV (a) 4,6 - Dichloro - 2-phenyl-5-pyrimidinecarboxaldehyde (2.5 g.) is dissolved in glacial acetic acid (50 ml.). p-Benzyloxyaniline (2.0 g.) is added, and the solution is allowed to stand until a precipitate is formed. Yield of 5 - [N - (p-benzyloxyphenyl)formimidoyl]-4,6-dichloro-2-phenylpyrimidine, 2.5 g., after recrystallization from cyclohexane; m.p. 168–171°.

Analysis for $C_{24}H_{17}Cl_2N_3O$.—Calculated: C, 66.37; H, 3.94; N, 9.67; Cl, 16.33. Found: C, 66.54; H, 3.64; N, 9.90; Cl, 16.01.

(b) In a similar manner using anthranilamide in place of p-benzyloxyaniline there is obtained 2-[(4,6-dichloro-2 - phenyl - 5 - pyrimidinylmethylene)amino]benzamide; m.p. after recrystallization from ethanol, 159–161°.

Analysis for $C_{18}H_{12}Cl_2N_4O$.—Calculated: C, 58.24; H, 3.26; N, 15.09; Cl, 19.10. Found: C, 58.24; H, 3.52; N, 15.05; Cl, 19.15.

EXAMPLE V 4,6 - Dichloro - 2-phenyl-5-pyrimidinecarboxaldehyde (5.1 g.) is dissolved in glacial acetic acid (50 ml.). 4-Aminoacetanilide (3.0 g.) is added. The solution is warmed gently and then cooled in an ice bath. Yield of 4' - [(4,6 - dichloro - 2-phenyl-5-pyrimidinylmethylene)amino]acetanilide, after recrystallization from ethanol, 2.2 g.; m.p. 215–218°.

Analysis for $C_{19}H_{14}Cl_2N_4O$.—Calculated: C, 59.24; H, 3.66; N, 14.54; Cl, 18.40. Found: C, 59.56; H, 3.78; N, 14.44; Cl, 18.17.

EXAMPLE VI

A compound of Formula I is administered orally (P.O.) or intraperitoneally (I.P.) to each of three mice. The animals are observed for signs of CNS-depressant activity, such as decreased motor activity, sedation, ataxia, loss of righting reflex, and decreased respiration. When tested as above-described, the following compounds gave results as shown below.

2 - (4,6 - dichloro - 2 - methylthio - 5 - pyrimidinyl) benzothiazoline—decreased motor activity, ataxia, and decreased respiration, 40 mg./kg. (I.P.); sedation-ataxia, 400 mg./kg. (I.P.);

2 - (4,6 - dichloro - 2 - phenyl - 5 - pyrimidinyl)benzothiazoline—decreased motor activity, sedation-ataxia, ataxia and decreased respiration, 127 mg./kg. (I.P.);

4,6 - dichloro - 5 - [N-(p-chlorophenyl)formimidoyl]-2 - phenylpyrimidine—decreased motor activity and decreased respiration, 400 mg./kg. (I.P.);

4,6 - dichloro - 5 - [N-(o-chlorophenyl)formimidoyl]-2 - phenylpyrimidine—decreased motor activity and decreased respiration, 127 mg./kg. (I.P.);

4,6 - dichloro - 5-[N-(p-methoxyphenyl)formimidoyl]-2 - phenylpyrimidine—decreased motor activity and decreased respiration, 127 mg./kg. (I.P.);

4,6 - dichloro - 5-[N-(o-chlorophenyl)formimidoyl]-2 - methylthiopyrimidine—decreased motor activity and decreased respiration, 40 mg./kg. (I.P.);

4,6 - dichloro - 5-[N-(5-chloro-o-tolyl)formimidoyl]-2 - methylthiopyrimidine—decreased motor activity and decreased respiration, 127 mg./kg. (I.P.);

5 - [N - (p - benzyloxyphenyl)formimidoyl] - 4,6 - dichloro - 2 - phenylpyrimidine—decreased motor activity, ataxia and decreased respiration, 127 mg./kg. (I.P.); sedation-ataxia, 40 mg./kg. (I.P.);

4' - [(4,6 - dichloro - 2 - phenyl - 5 - pyrimidinylmethylene)amino]acetanilide—decreased motor activity and decreased respiration, 400 mg./kg. (P.O.).

In addition to CNS-depressant activity, 4,6 - dichloro-5 - [N - (p - chlorophenyl)formimidoyl] - 2 - methylthiopyrimidine exhibits blood pressure lowering activity in hypertensive rats at a dosage of 100 mg./kg. (P.O.).

What is claimed is:

1. A compound of the formula:

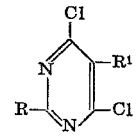

where R is methylthio or phenyl and $R^1$ is 2-benzothiazolinyl, N - (halophenyl)formimidoyl, N - (p - methoxyphenyl)formimidoyl, N - (3,5 - dichloro - 4 - hydroxyphenyl)formimidoyl, N - (5 - chloro - o - tolyl)formimidoyl, N - (p - benzyloxyphenyl)formimidoyl, N - (2-carbamoylphenyl)formimidoyl, N - (4 - acetamidophenyl)formimidoyl.

2. A compound as defined in Claim 1 which is: 2-(4,6-dichloro-2-methylthio-5-pyrimidinyl)benzothiazoline.

3. A compound as defined in Claim 1 which is: 2-(4,6-dichloro-2-phenyl-5-pyrimidinyl)benzothiazoline.

4. A compound as defined in Claim 1 which is: 4,6-dichloro-5-[N-(p-chlorophenyl)formimidoyl] - 2 - phenylpyrimidine.

5. A compound as defined in Claim 1 which is: 4,6-dichloro-5-[N-(o-chlorophenyl)formimidoyl] - 2 - phenylpyrimidine.

6. A compound as defined in Claim 1 which is: 4,6-dichloro - 5-[N-(p-methoxyphenyl)formimidoyl]-2-phenylpyrimidine.

7. A compound as defined in Claim 1 which is: 4,6-dichloro-5-[N-(p-chlorophenyl)formimidoyl] - 2 - methylthiopyrimidine.

8. A compound as defined in Claim 1 which is: 2,6-dichloro-4-[(4,6-dichloro - 2 - methylthio - 5 - pyrimidinylmethylene)amino]phenol.

9. A compound as defined in Claim 1 which is: 4,6-dichloro-5-[N-(o-chlorophenyl)formimidoyl] - 2 - methylthiopyrimidine.

10. A compound as defined in Claim 1 which is: 4,6-dichloro-5-[N-(5-chloro-o-tolyl)formimidoyl]-2 - methylthiopyrimidine.

11. A compound as defined in Claim 1 which is: 5-[N-(p-benzyloxyphenyl)formimidoyl] - 4,6 - dichloro - 2-methylthiopyrimidine.

12. A compound as defined in Claim 1 which is: 5-[N-(p-benzyloxyphenyl)formimidoyl] - 4,6 - dichloro - 2-phenylpyrimidine.

13. A compound as defined in Claim 1 which is: 2-[(4,6-dichloro - 2 - phenyl - 5 - pyrimidinylmethylene)amino]benzamide.

14. A compound as defined in Claim 1 which is: 4'-[4,6-dichloro - 2 - phenyl - 5 - pyrimidinylmethylene)amino] acetanilide.

References Cited

UNITED STATES PATENTS 3,631,045  12/1971  Kim et al. _____ 260—256.5 R

OTHER REFERENCES

Chem. Ber. 100:1344–1352 (1967), Bredèreck et al.

JOHN D. RANDOLPH, Primary Examiner

S. D. WINTERS, Assistant Examiner

U.S. Cl. X.R.

260—256.5 R, 256.4 N, 251 R; 424—251